US012584735B2

(12) United States Patent

Noh

(10) Patent No.: US 12,584,735 B2

(45) Date of Patent: Mar. 24, 2026

(54) WATERTIGHT CAP FOR ANGLE SENSOR COVER AND ANGLE SENSING DEVICE COMPRISING THE SAME

(71) Applicant: HL MANDO CORPORATION, Pyeongtaek (KR)

(72) Inventor: Youngheon Noh, Yongin (KR)

(73) Assignee: HL MANDO CORPORATION, Pyeongtaek (KR)

( * ) Notice: Subject to any disclaimer, the term of this patent is extended or adjusted under 35 U.S.C. 154(b) by 263 days.

(21) Appl. No.: 18/341,943

(22) Filed: Jun. 27, 2023

(65) Prior Publication Data

US 2024/0035818 A1 Feb. 1, 2024

(51) Int. Cl.
*G01B 21/22* (2006.01)

(52) U.S. Cl.
CPC .................................... *G01B 21/22* (2013.01)

(58) Field of Classification Search
CPC ...................................................... G01B 21/22
See application file for complete search history.

(56) References Cited

U.S. PATENT DOCUMENTS

2013/0257232 A1 * 10/2013 Tomizawa ............. H02K 29/08
310/68 R
2015/0115754 A1 * 4/2015 Yamasaki ................ H02K 5/04
310/71

FOREIGN PATENT DOCUMENTS

| | | | |
|---|---|---|---|
| DE | 112015001311 T5 * | 12/2016 | ............... B62D 5/24 |
| EP | 4181324 B1 * | 2/2024 | ......... H01R 13/5213 |
| JP | 2017124784 A | 7/2017 | |
| JP | 7656506 B2 * | 4/2025 | ......... B62D 81/3841 |
| KR | 101452559 B1 * | 10/2014 | ............... B62D 6/10 |
| KR | 20150069181 A * | 6/2015 | ........... G01D 11/245 |
| KR | 102189711 B1 * | 12/2020 | |

* cited by examiner

*Primary Examiner* — Jamel E Williams

(74) *Attorney, Agent, or Firm* — Harvest IP Law, LLP

(57) ABSTRACT

Disclosed herein is a watertight cap for an angle sensor cover. The watertight cap installed on a cover installed on an upper end of an angle sensor housing includes a lower portion having a tapered shape toward a lower side, an intermediate portion extending upwardly from the lower portion, a cap portion having a larger diameter than a diameter of the intermediate portion, and an upper portion protruding upwardly from an upper surface of the cap portion.

19 Claims, 7 Drawing Sheets

WATERTIGHT CAP FOR ANGLE SENSOR COVER AND ANGLE SENSING DEVICE COMPRISING THE SAME

CROSS-REFERENCE TO RELATED APPLICATION

This application claims the benefit of Korean Patent Application No. 10-2022-0095618, filed on Aug. 1, 2022 in the Korean Intellectual Property Office, the disclosure of which is incorporated herein by reference.

BACKGROUND

1. Field

Embodiments of the present disclosure relate to a watertight cap for an angle sensor cover and an angle sensing device including the same.

2. Description of the Related Art

In general, a steering apparatus of a vehicle is an apparatus for changing a traveling direction of the vehicle according to a driver's intention, and is an apparatus for assisting the driver to optionally change a center of rotation around which the front wheels of the vehicle are turned so that the vehicle travels in a desired direction of the driver. As a power-assisted steering apparatus of a vehicle, a hydraulic power steering apparatus using hydraulic pressure of a hydraulic pump is generally used, but these days, an electric power steering apparatus using a motor is increasingly used.

The vehicle is steered by turning a steering wheel while the vehicle is traveling or stopped and thus turning the wheels in contact with a road surface, but, since frictional force acts between the wheels and the road surface, the wheels are not turned as much as a turning angle of the steering wheel due to losses during a power transmission process.

Accordingly, a device for measuring and compensating for a rotation angle deviation between the steering wheel and the wheels is required, and a torque sensor performs this function. That is, the vehicle may be safely and accurately steered in a desired direction of travel of the vehicle by measuring a rotation angle deviation between a rotation angle of the steering wheel and a rotation angle of the wheels by the torque sensor and turning the wheels using a separate power device as much as the measured deviation.

SUMMARY

Therefore, it is an aspect of the present disclosure to provide a watertight cap for an angle sensor cover having a structure capable of preventing water accumulation.

It is another aspect of the present disclosure to provide a watertight cap for an angle sensor cover having a structure in which mutual coupling with a jig is easy.

Additional aspects of the disclosure will be set forth in part in the description which follows and, in part, will be obvious from the description or may be learned by practice of the disclosure.

In accordance with one aspect of the present disclosure, a watertight cap installed on a cover installed on an upper end of an angle sensor housing includes a lower portion having a tapered shape toward a lower side, an intermediate portion extending upwardly from the lower portion, a cap portion formed on an upper side of the intermediate portion and having a larger diameter than a diameter of the intermediate portion, and an upper portion protruding upwardly from an upper surface of the cap portion.

At least one ring-shaped protrusion may be formed on an outer circumferential surface of the intermediate portion.

A diameter of a part of the lower portion that is connected to the intermediate portion may be larger than a diameter of the intermediate portion.

A hole may be formed in the cover, and a diameter of the intermediate portion may have a size corresponding to a diameter of the hole.

The lower portion may be configured to pass through the hole by receiving a force generated when the upper portion is pressed downward by a jig.

The upper portion may have a shell shape surrounding an empty space.

Slit grooves may be formed in the shell shape at positions facing each other.

The slit groove may receive a downward force by a jig having a square column-shaped fastener having a size corresponding to the slit groove.

A bottom of the slit groove may be formed parallel to an upper surface of the cap portion.

The lower portion and the intermediate portion may have a shell shape surrounding an empty space.

An opening may be formed at an end of the lower portion to communicate with the empty space.

The cap portion may be formed to seal an upper side of the empty space.

A lower surface of the cap portion may be configured to act as a locking jaw on an upper surface of the cover.

An upper surface of the lower portion may be configured to act as a locking jaw on a lower surface of the cover.

In accordance with another aspect of the present disclosure, an angle sensing device includes a housing installed on a steering shaft assembly, an angle sensor installed in the housing, a cover installed on an upper end of the housing and having a hole formed therein, and the watertight cap for an angle sensor cover according to the aspect described above installed to seal the hole.

The watertight cap may be made of an elastic material.

A height of the intermediate portion may be equal to or smaller than a thickness of the cover.

The hole may be formed at a position through which a central axis of the angle sensor passes in the cover.

An upper surface of the lower portion may be in close contact with a lower surface of the cover, and a lower surface of the cap portion may be in close contact with an upper surface of the cover.

The cover may be coupled to the housing by a bolt.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
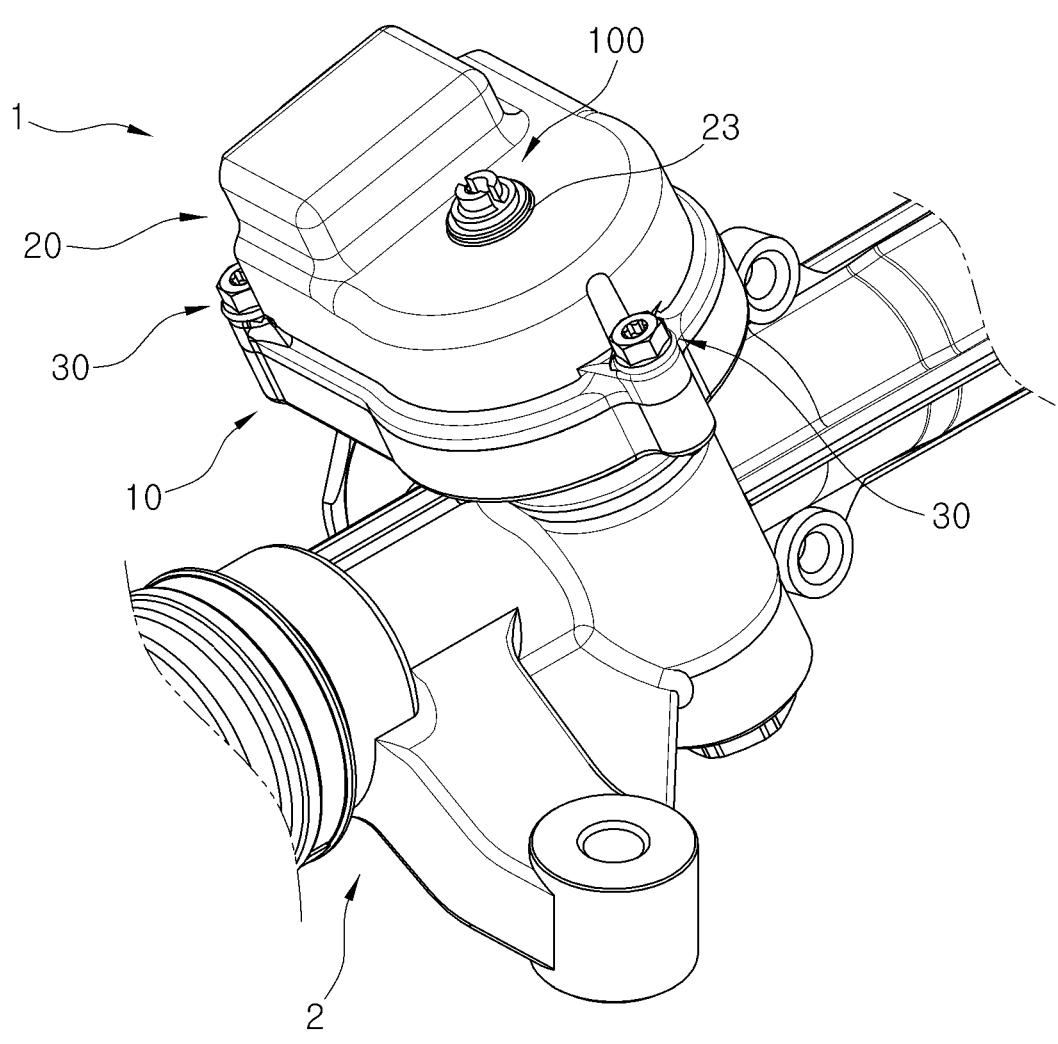
FIG. 1 is a perspective view illustrating an angle sensing device in accordance with one embodiment of the present disclosure.

Hereinafter, embodiments of the present disclosure will be described in detail with reference to the accompanying drawings. The following embodiments are provided to completely convey the spirit of the present disclosure to those skilled in the art to which the present disclosure pertains. The present disclosure is not limited to the embodiments shown herein and may be embodied in other forms. In the drawings, parts that bear no relation to descriptions may be omitted in order to clarify the present disclosure, and elements may be exaggerated in sizes thereof for ease of understanding.

Figure 2:
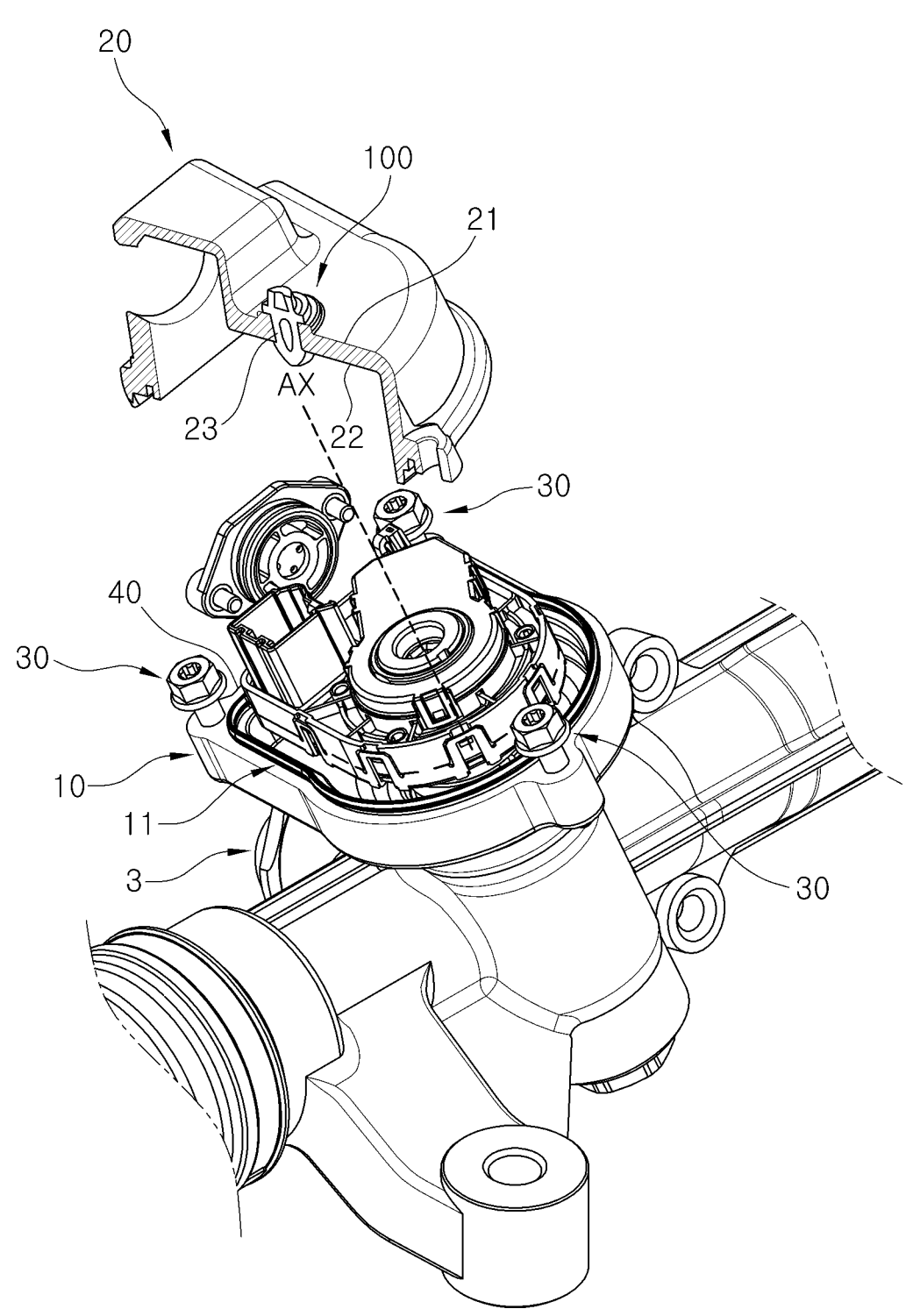
FIG. 2 is a partial cross-sectional view illustrating an interior of the angle sensing device of FIG. 1.

FIG. 1 is a perspective view illustrating an angle sensing device in accordance with one embodiment of the present disclosure. FIG. 2 is a partial cross-sectional view illustrating an interior of the angle sensing device of FIG. 1. FIG. 2 shows a cross section in a state in which a watertight cap is coupled to a cover.

An angle sensing device 1 may include a housing 10 installed on a steering shaft assembly 2, an angle sensor 40 installed in the housing 10, a cover 20 installed on an upper end of the housing 10 and having a hole 23 formed therein, and a watertight cap 100 for an angle sensor cover installed to seal the hole 23. The hole 23 may be formed at a position where a central axis AX of the angle sensor 40 passes in the cover 20. The watertight cap 100 may be press-fitted into the hole 23 and coupled thereto.

The cover 20 may be assembled to the housing 10 by bolts 30. A sealing portion 11 may be provided in the housing 10 to seal a gap between the housing 10 and the cover 20. The watertight cap 100 may be closely coupled to an upper surface 21 and a lower surface 22 of the cover 20, and details thereof will be described below.

A yoke hole 3 installed in the steering shaft assembly 2 has a function of enabling yoke clearance direct measurement. This enables direct measurement of the yoke in a manufacturing process, thereby improving the precision of friction and rattle performance.

The yoke hole 3 has to be guaranteed to be watertight, and the watertight cap 100 is applied for this purpose. However, a shape of the watertight cap made by an intaglio method may cause water accumulation and may have a structure that allows moisture to permeate when the inside of the cap 100 is torn due to negligence in manufacturing. Therefore, the watertight cap 100 in accordance with the embodiment may be used to tightly seal the yoke hole 3 against water.

When the steering system is of the R-EPS type, since the steering system has a structure in which the steering shaft itself is inserted into a torque sensor, the watertight cap in accordance with the embodiment may not be used. In contrast, when the steering system is of the RWA Gear type, a hole is formed to measure an axial clearance of an idler shaft above the angle sensor, and the robust watertight cap 100 needs to be applied to this part.

Figure 3:
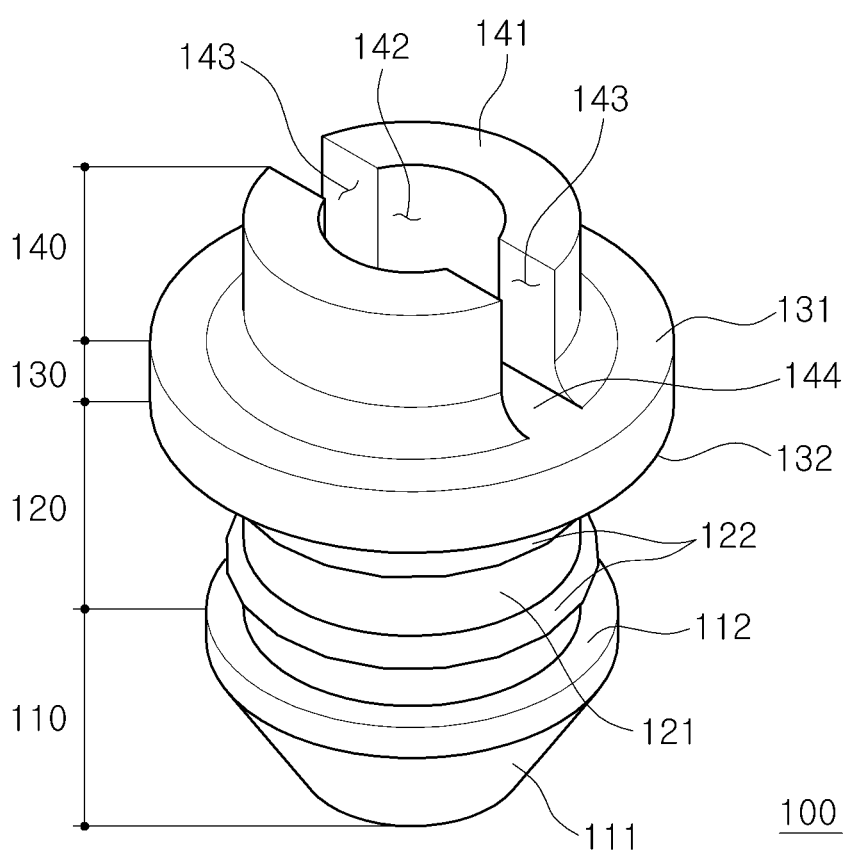
FIG. 3 is a perspective view illustrating a watertight cap for an angle sensor cover in accordance with one embodiment of the present disclosure.
Figure 4:
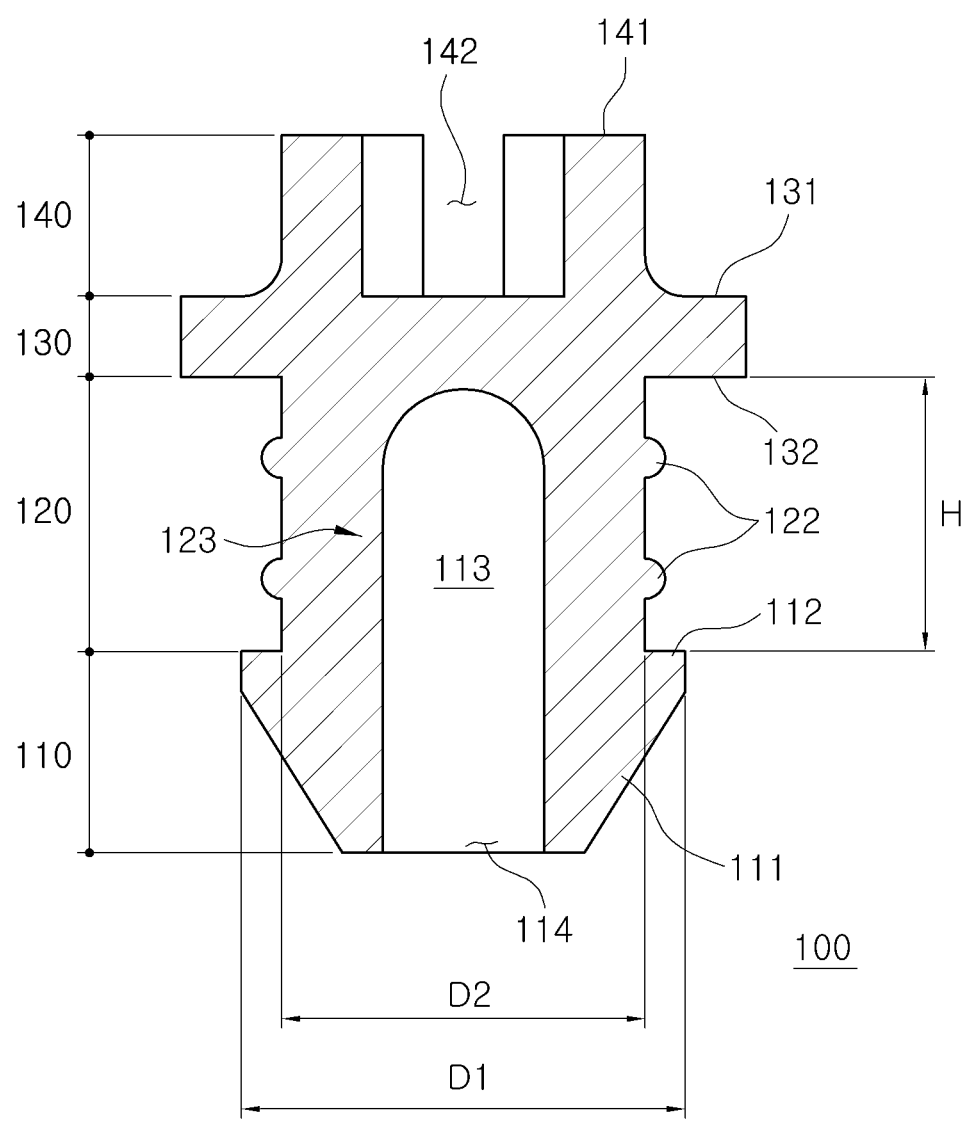
FIG. 4 is a cross-sectional view illustrating a cross section of the watertight cap illustrated in FIG. 3.

FIG. 3 is a perspective view illustrating the watertight cap for an angle sensor cover in accordance with one embodiment of the present disclosure. FIG. 4 is a cross-sectional view illustrating a cross section of the watertight cap illustrated in FIG. 3.

The watertight cap 100 installed on the cover 20 installed on the upper end of the angle sensor housing 10 may include a lower portion 110 having a tapered shape toward a lower side, an intermediate portion 120 extending upwardly from the lower portion 110, a cap portion 130 formed on an upper side of the intermediate portion 120 and having a larger diameter than a diameter of the intermediate portion 120, and an upper portion 140 protruding upwardly from an upper surface 131 of the cap portion 130. The watertight cap 100 may be made of an elastic material (e.g., rubber) as a whole.

A diameter of a part of the lower portion 110 that is connected to the intermediate portion 120, that is, a diameter D1 of an upper surface 112 of the lower portion 110 may be larger than a diameter D2 of the intermediate portion 120. An outer circumferential surface 111 of the lower portion 110 may have an inclined conical shape. Since the lower portion 110 penetrates the hole 23 better by its conical outer circumferential surface 111, the watertight cap 100 may easily pass through the hole 23, and once the lower portion 110 completely passes through the hole 23, the watertight cap 100 may not be easily removed from the cover 20.

At least one ring-shaped protrusion 122 may be formed on an outer circumferential surface of the intermediate portion 120. The protrusion 122 may come into close contact with an inner wall of the hole 23 to enhance frictional force with the cover 20. In addition, the diameter D2 of the intermediate portion 120 may have a size corresponding to a diameter of the hole 23. That is, the diameter D2 of the intermediate portion 120 may be equal to or larger than the diameter of the hole 23.

Referring to FIG. 3, the upper portion 140 may have a shell shape 141 surrounding an empty space 142. Slit grooves 143 may be formed in the shell shape 141 at positions facing each other. A bottom 144 of the slit groove 143 may be formed parallel to the upper surface 131 of the cap portion 130.

Referring to FIG. 4, the lower portion 110 and the intermediate portion 120 may have a shell shape 123 surrounding an empty space 113. An opening 114 may be formed at an end of the lower portion 110 to communicate with the empty space 113. Meanwhile, the cap portion 130 may be formed to seal an upper side of the empty space 113.

Referring to FIGS. 2 and 4, the upper surface 112 of the lower portion 110 may be in close contact with the lower surface 22 of the cover 20, and the lower surface 132 of the cap portion 130 may be in close contact with the upper surface 21 of the cover 20. A height H1 of the intermediate portion 120 may be equal to or smaller than a thickness of the cover 20. That is, the lower surface 132 of the cap portion 130 may be configured to act as a locking jaw on the upper surface 21 of the cover 20. The upper surface 112 of the lower portion 110 may be configured to act as a locking jaw on the lower surface 22 of the cover 20.

In this way, since the cap portion 130 and the lower portion 110 support the cover 20 from the upper and lower sides thereof with the cove 20 interposed therebetween in a state in which the watertight cap 100 is installed on the cover 20, a possibility of moisture inflow into the housing 10 may be substantially blocked.

Figure 5:
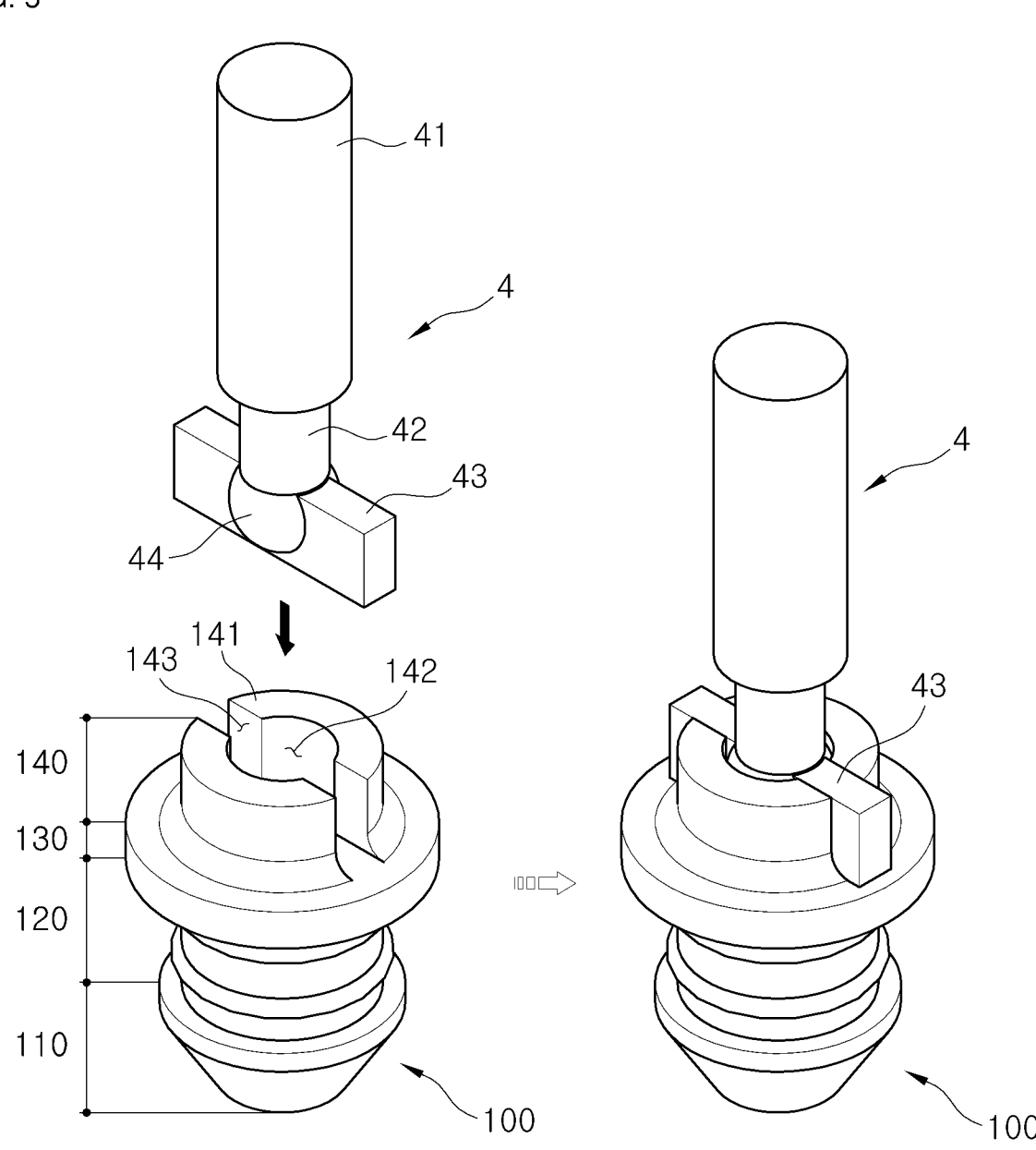
FIG. 5 is a perspective view illustrating a state in which a jig is used for the watertight cap illustrated in FIG. 4.

FIG. 5 is a perspective view illustrating a state in which a jig is used for the watertight cap illustrated in FIG. 4.

The watertight cap 100 may be installed in the hole 23 to be formed in the cover 20 by a jig 4. The lower portion 110 of the watertight cap 100 may be configured to pass through the hole 23 by receiving a force generated when the upper portion 140 is pressed downward by the jig 4. The jig 4 may include a handle 41, a pillar 42, and a fastener 43. The fastener 43 may include a ball-shaped pestle 44.

The slit groove 143 may receive a downward force by the jig 4 having the square column-shaped fastener 43 having a size corresponding to the slit groove 143. The pestle 44 may have a size that fits perfectly into the empty space 142.

Figure 6:
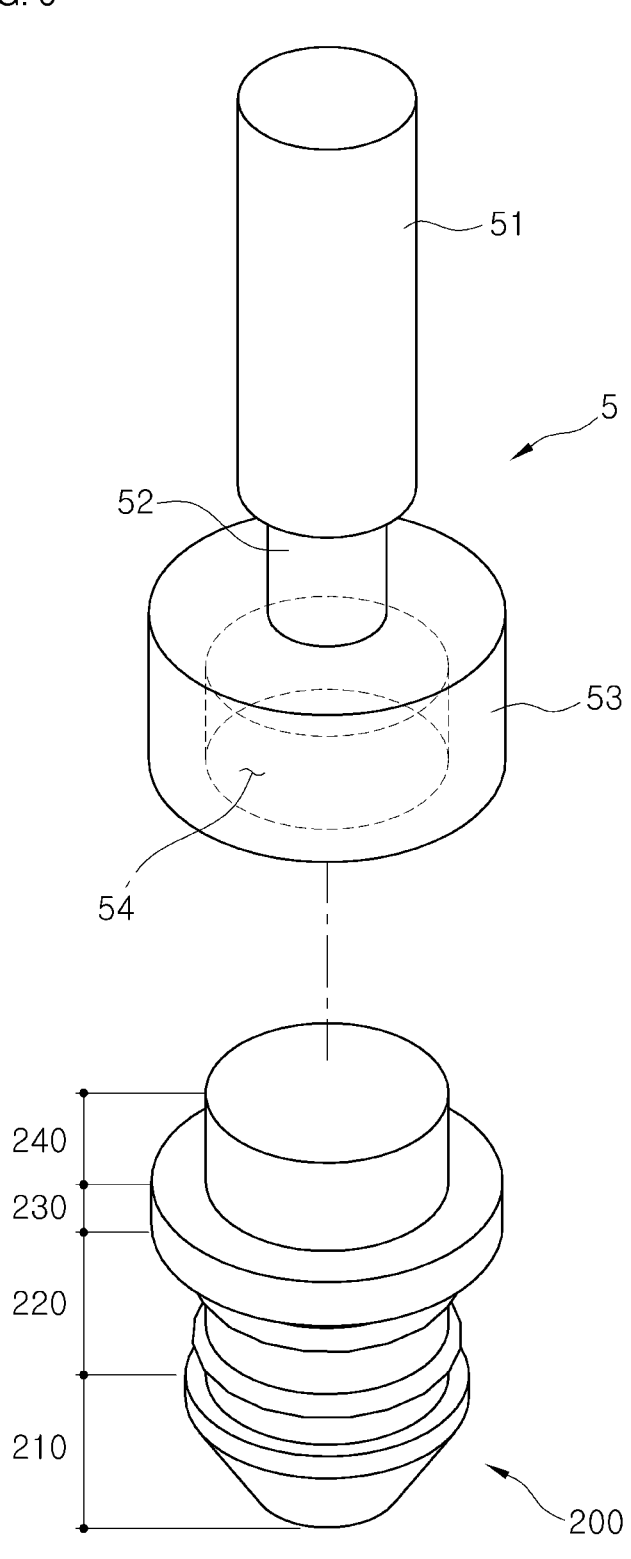
FIG. 6 is a perspective view illustrating a watertight cap for an angle sensor cover and a jig in accordance with another embodiment of the present disclosure.
Figure 7:
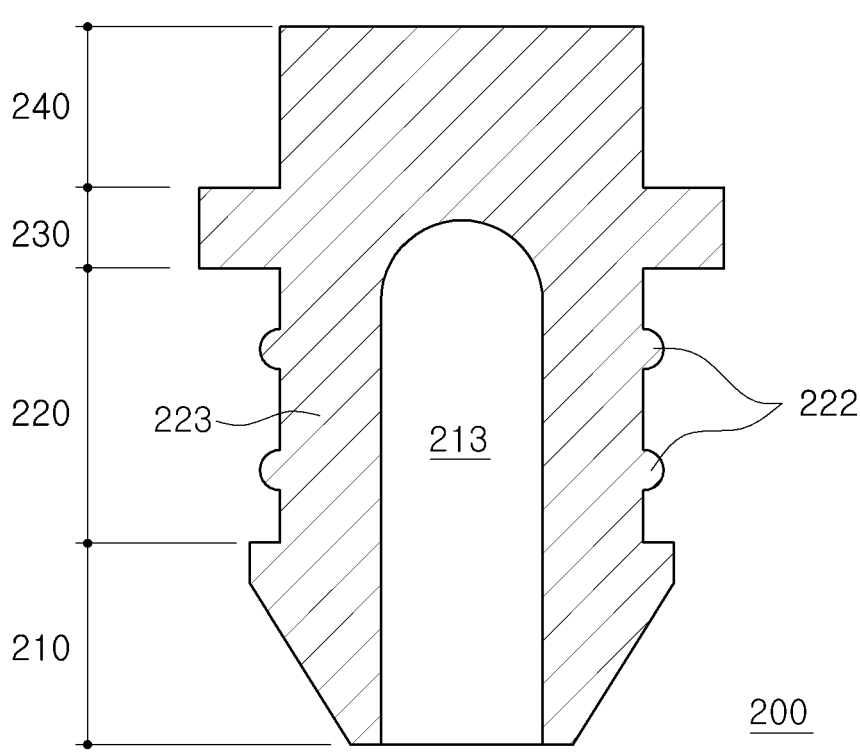
FIG. 7 is a cross-sectional view illustrating a cross section of the watertight cap illustrated in FIG. 6.

FIG. 6 is a perspective view illustrating a watertight cap for an angle sensor cover and a jig in accordance with another embodiment of the present disclosure. FIG. 7 is a cross-sectional view illustrating a cross section of the watertight cap illustrated in FIG. 6. Redundant description of the contents described in the above-described embodiment will be omitted.

A watertight cap 200 may include a lower portion 210 having a tapered shape toward a lower side, an intermediate portion 220 extending upwardly from the lower portion 210, a cap portion 230 formed on an upper side of the intermediate portion 220 and having a larger diameter than a diameter of the intermediate portion 220, and an upper portion 240 protruding upwardly from an upper surface of the cap portion 230. Unlike the aforementioned watertight cap 100, in the watertight cap 200 illustrated in FIG. 6, the upper portion 240 may have a cylindrical shape.

A jig 5 used to install the watertight cap 200 to the cover 20 may include a handle 51, a pillar 52, and a fastener 53. The fastener 53 may have a shell shape surrounding an empty space 54. When the jig 5 is used, the upper portion 240 may be inserted into the empty space 54.

For the shape of the watertight cap in accordance with the embodiment, a slit shape may be applied to the upper portion having an embossed shape. A function of the watertight cap may correspond to a function of sealing the cover for an angle sensor cover against water from the outside. A method of assembling the watertight cap may be a method of press-fitting the watertight cap into the angle sensor cover. That is, the assembling may be performed with a jig corresponding to the outer side of the watertight cap and the shape of the slit groove. Since the slit shape is provided to the watertight cap to have a drain function, it is possible to lower the possibility of water accumulation. In addition, since there is no need to insert the jig into the watertight cap, tearing of the watertight cap can be prevented.

As is apparent from the above description, since an upper end of a watertight cap for an angle sensor cover in accordance with one embodiment of the present disclosure is blocked, it is possible to prevent water from seeping into the angle sensor housing.

In addition, since the watertight cap for an angle sensor cover in accordance with one embodiment of the present disclosure has a slit-shaped groove formed at the upper end, it is possible to easily assemble the watertight cap to the cover.

As described above, the present disclosure has been hereinabove described with regard to a limited number of embodiments and drawings, but the present disclosure is not limited thereto and it is obvious to those skilled in the art that various modifications and changes may be made thereto within the technical spirit of the present disclosure and the equivalent scope of the appended claims.

What is claimed is:

1. A watertight cap for sealing a hole of a cover installed on an upper end of an angle sensor housing, the watertight cap comprising:

a lower portion having a tapered shape toward a lower side;

an intermediate portion extending upwardly from the lower portion; and a cap portion formed on an upper side of the intermediate portion and having a larger diameter than a diameter of the intermediate portion, wherein at least one ring-shaped protrusion is formed on an outer circumferential surface of the intermediate portion.

2. The watertight cap according to claim 1, wherein a diameter of an upper part of the lower portion that is connected to the intermediate portion is larger than a diameter of the intermediate portion.

3. The watertight cap according to claim 1, wherein a diameter of the intermediate portion is equal to or larger than a diameter of the hole.

4. The watertight cap according to claim 3, further comprising an upper portion protruding upwardly from an upper surface of the cap portion, wherein the lower portion is configured to pass through the hole by receiving a force generated when the upper portion is pressed downward by a jig.

5. The watertight cap according to claim 1, further comprising an upper portion protruding upwardly from an upper surface of the cap portion, wherein the upper portion has a shell shape surrounding an empty space.

6. The watertight cap according to claim 5, wherein slit grooves are formed in the shell shape at positions facing each other.

7. The watertight cap according to claim 6, wherein the slit grooves configured to receive a downward force by a jig having a square column-shaped fastener having a size corresponding to the slit groove.

8. The watertight cap according to claim 1, wherein the lower portion and the intermediate portion have a shell shape surrounding an empty space.

9. The watertight cap according to claim 8, wherein an opening is formed at a downward end of the lower portion to communicate with the empty space.

10. The watertight cap according to claim 8, wherein the cap portion is formed to seal an upper side of the empty space.

11. The watertight cap according to claim 1, wherein a lower surface of the cap portion is configured to act as a locking jaw on an upper surface of the cover.

12. The watertight cap according to claim 2, wherein an upper surface of the upper part of the lower portion is configured to act as a locking jaw on a lower surface of the cover.

13. The watertight cap according to claim 12, wherein the watertight cap is made of an elastic material, wherein the lower portion and the intermediate portion have a shell shape surrounding an empty space formed with an opening at a downward end of the lower portion to communicate with the empty space, wherein the intermediate portion has the diameter equal to or larger than a diameter of the hole, wherein a height of the intermediate portion is equal to or smaller than a thickness of the cover.

14. An angle sensing device comprising:

a housing installed on a steering shaft assembly;

an angle sensor installed in the housing;

a cover installed on an upper end of the housing and having a hole formed therein; and a watertight cap for sealing the hole, the watertight cap comprising:

a lower portion having a tapered shape toward a lower side;

an intermediate portion extending upwardly from the lower portion; and a cap portion formed on an upper side of the intermediate portion and having a larger diameter than a diameter of the intermediate portion, wherein at least one ring-shaped protrusion is formed on an outer circumferential surface of the intermediate portion.

15. The angle sensing device according to claim 14, wherein the watertight cap is made of an elastic material.

16. The angle sensing device according to claim 14, wherein a height of the intermediate portion is equal to or smaller than a thickness of the cover.

17. The angle sensing device according to claim 14, wherein the hole is formed at a position through which a central axis of the angle sensor passes in the cover.

18. The angle sensing device according to claim 14, wherein a diameter of an upper part of the lower portion that is connected to the intermediate portion is larger than a diameter of the intermediate portion, and wherein an upper surface of the upper part of the lower portion is in close contact with a lower surface of the cover, and a lower surface of the cap portion is in close contact with an upper surface of the cover.

19. The angle sensing device according to claim 14, wherein an upper portion protruding upwardly from an upper surface of the cap portion.

\* \* \* \* \*